United States Patent [19]
Spahl

[11] 3,779,578
[45] Dec. 18, 1973

[54] MOTOR VEHICLE WITH A MECHANICALLY-OPERABLE SAFETY BELT SYSTEM

[75] Inventor: Edwin Spahl, Cologne, Germany

[73] Assignee: Ford Motor Company, Dearborn, Mich.

[22] Filed: Mar. 15, 1972

[21] Appl. No.: 234,722

[30] Foreign Application Priority Data
July 1, 1971    Germany.................. P 21 32 694.3

[52] U.S. Cl............................................ 280/150 SB
[51] Int. Cl............................................ B60n 21/02
[58] Field of Search.................. 280/150 SB, 150 B; 297/389, 388

[56] References Cited
UNITED STATES PATENTS

| | | | |
|---|---|---|---|
| 3,236,540 | 2/1966 | Berton............................ | 280/150 SB |
| 3,348,881 | 10/1967 | Weman........................ | 280/150 SB |
| 3,583,726 | 6/1971 | Lindblad....................... | 280/150 SB |

*Primary Examiner*—Robert R. Song
*Attorney*—Keith L. Zerschling et al.

[57] ABSTRACT

A motor vehicle body in which a seat having a backrest is fitted with a mechanically operable three point safety belt system, the belt system having mutually independent shoulder and lap belt sections. The belt system includes a first attachment means receiving one end of the shoulder belt section and a second attachment means receiving one end of the lap belt section, the first and second attachment means being located at upper and lower locations, respectively, of a side wall of the vehicle body. A third attachment means located at the center of the vehicle body receives the other ends of both belt sections.

The belt system is characterized in that a flexible stiffener member carrying drive engageable means is secured to a substantial length of each belt section. The third attachment means comprises a guide device with the two belt sections passing through guide sleeves in the guide device. The guide sleeves are equipped with drive means engageable with the drive engageable means on the belt section stiffeners. The stiffened belt sections are extensible by the drive means into an extended position in which they form free-standing belt loops which, by pivoting the guide sleeves substantially about an axis lying in the plane of the seat backrest, can be pivoted into an inoperative position.

14 Claims, 5 Drawing Figures

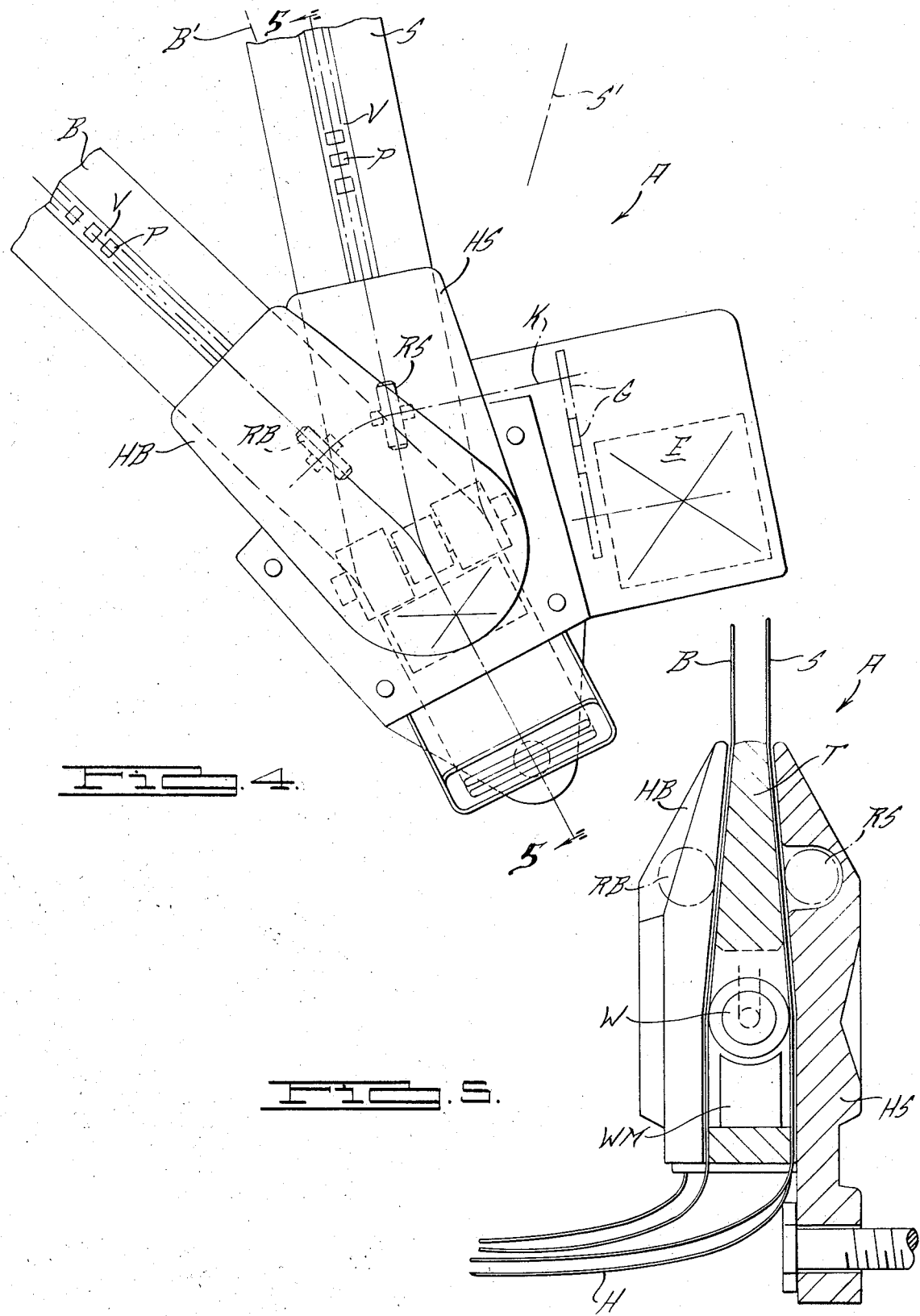

MOTOR VEHICLE WITH A MECHANICALLY-OPERABLE SAFETY BELT SYSTEM

A motor vehicle with a mechanically operable safety belt system of the kind introductorily described is already known in which the third attachment point of a three-point safety belt is mechanically displaceable in a guide in the vehicle door. The two other attachment points in this case have to be located at the vehicle center.

In these known safety belt systems, a variety of difficulties arise.

The attachment of the inner, upper attachment point to a roof cross-member is too high, attachment to a vertical center pillar requires extra constructional outlay, and attachment to the backrest of the seat makes it necessary to reinforce the entire seat construction as well as the seat fixings.

Securement of the third attachment point to the vehicle door makes it necessary to reinforce the bottom edge of the door in the neighborhood of the latch mechanism and possibly to provide an additional latch mechanism to the door sill.

The accessibility to the seat, which is available on entry to the vehicle when this kind of safety belt system is fitted, is inadequate, despite the belt reel-in mechanism which is needed, because of the presence of the belt sections which extend obliquely over the seat.

The object of the invention is to create a mechanically operable safety belt system in which the attachment points provided in the vehicle for conventional seating belts can be utilized, and in which no interference with freedom of access to the seat results.

SUMMARY OF THE INVENTION

In accordance with the invention, the objective is achieved in that mutually independent shoulder and lap belts are provided over their full length with an elastic stiffening insert carrying a drive profile, the two belt sections each being passed through respective guide sleeves equipped with drive mechanisms, and having a length such that in the extended position they form free-standing belt loops which, by pivoting the guide sleeves substantially about an axis lying in the plane of the seat backrest, can be pivoted into an inoperative position.

The stiffening insert will in this context preferably be constituted by an elastic synthetic material band secured for example by injection-molding to a known kind of belt.

The drive profile will in this context preferably be constituted by perforations formed in the stiffening insert.

The stiffening insert is provided at specific locations with notches or incursions to achieve locally different radii of curvature in the belt loop.

The belt ends secured in pivotal fashion to the top and bottom of the vehicle body side wall are preloaded in the direction of the rest position of the free-standing belt loops, and are pivotable, through the medium of mechanical or electromechanical spring mechanisms and stops.

Arranged in a pivotable fixing component carrying the two guide sleeves there is a locking device common to the two belt sections and operated independently of the belt motion or the vehicle deceleration, which device takes the form of a locking roller movable in a taper slot between the two belt sections.

The drive unit of one guide sleeve, preferably the one belonging to the shoulder belt, is here connected to the drive unit of the other guide sleeve, the one associated with the lap belt, via a transmission device which substantially doubles the extension movement of the belt.

One drive unit is in this context operable by an electric motor which can be switched in manually or as a function of operations such as the starting of the engine or the like.

The electric motor is here provided in the belt extension direction with a limit switch device and in the belt closing direction with a disconnect device which limits the belt tension.

A mechanically operable safety belt system in accordance with the invention can be assembled to the conventional fixing points which are present on the body-work for normal safety belts, so that no reinforcing of door, roof or seat structures of a motor vehicle is necessary.

The new belt system is furthermore suitable in the same form, for both front and rear seats, and for two-door and four-door vehicles.

The new belt system does not interfere with access to the seats in any way, and moreover, can be fitted as a subsequent addition, according to type, to a vehicle not originally so equipped.

DESCRIPTION OF THE DRAWING

The invention will be explained in more detail making reference to an example illustrated schematically in the drawings.

FIG. 4 illustrates a schematic elevation and assembly of a drive mechanism.

FIG. 5 illustrates a schematic section on the line V—V of FIG. 4 with a second guide sleeve rotated at the plane of section.

DETAILED DESCRIPTION

Figure 1:
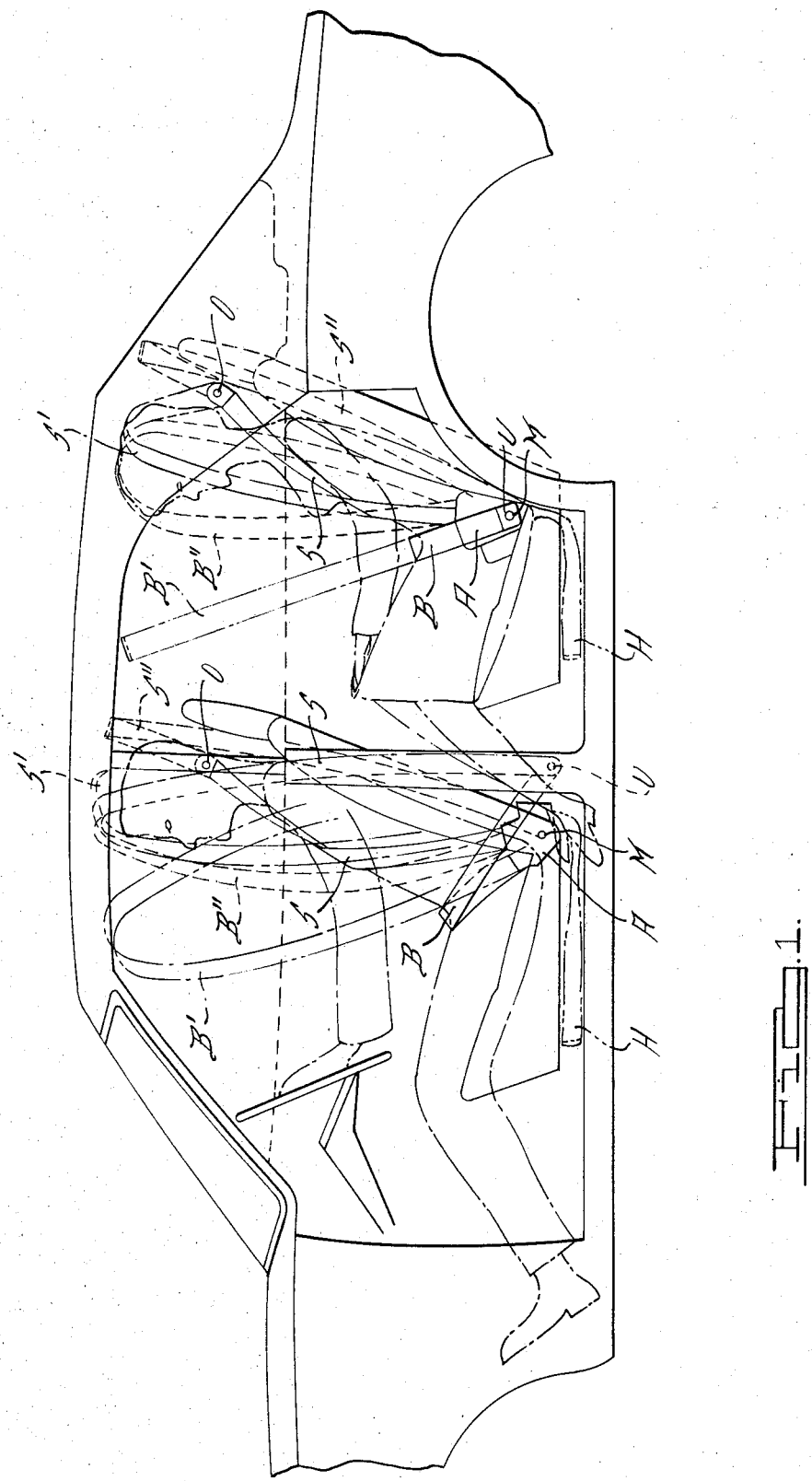
FIG. 1 illustrates a schematic side elevation of a motor vehicle whose occupants are adapted to be secured by a safety belt system in accordance with the invention, the closed belt sections having been shown in full line, the extended belt sections in chain-dotted line and the belt sections pivoted back into the inoperative position, in broken line.

FIG. 1 illustrates a schematic side elevation of a four-door motor vehicle, the vehicle doors having been omitted.

A front and a rear seat in the motor vehicle have each been indicated by an occupant shown in thick chain-dotted line.

Each occupant is secured by a three-point safety belt in accordance with the invention consisting of a shoulder belt S and a lap belt B. The shoulder and lap belts S and B are pivotally attached to the vehicle side wall through a conventional upper attachment point O and a conventional lower attachment point U, respectively. The other ends of the two belt sections S and B are passed through a drive mechanism A which is pivotally secured to the bodywork and to a third attachment point M.

The trajectories of the two belt sections S and B are indicated in full lines for the case in which the safety belt encompasses on the wearer. The trajectories of the belt sections when extended through the drive mechanisms A are indicated in thin chain-dotted line and marked S' and B'. The trajectories of the belt sections after pivoting into their inoperative positions are indicated in broken line and marked S'' and B''.

Figure 2:
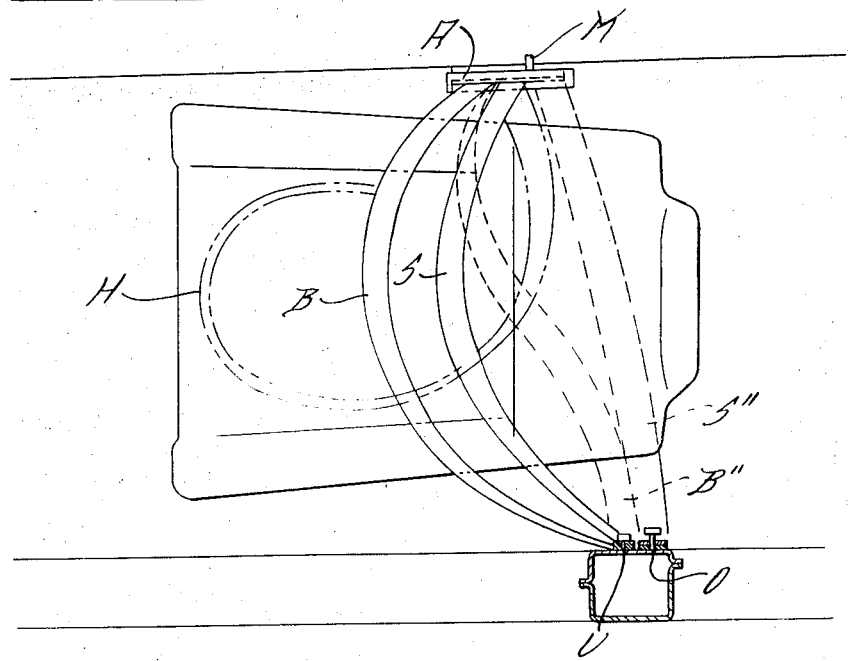
FIG. 2 illustrates a schematic plan view of the driver's seat in FIG. 1, showing the trajectories of the belt sections.
Figure 3:
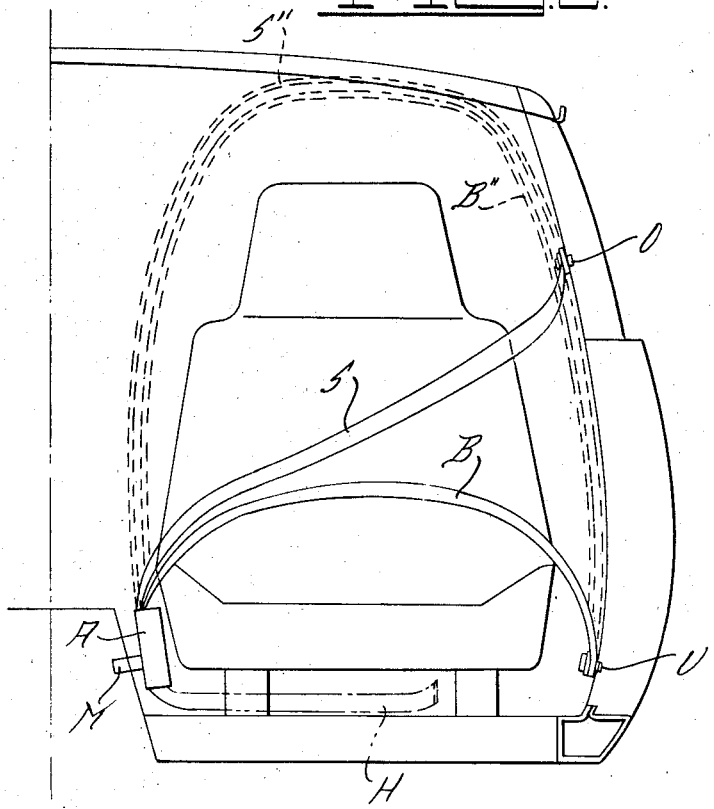
FIG. 3 illustrates a schematic front elevation of the driver's seat as FIG. 1 showing the trajectories of the belt sections.

In FIGS. 2 and 3, the same references have been used.

From FIG. 2, the trajectory of the envelope H, indicated in dash-double-dotted line, of the residual belt lengths when the safety belt is closed, has been shown.

From FIG. 3 it can be seen that in their inoperative positions, the belt sections are supported against parts of the side wall and roof trim of the passenger space. This supporting of the belt sections in their inoperative position can be achieved by pulling out an additional length of belt after the belt sections have been pivoted. The free-standing belt loops are then stabilized in their inoperative positions.

In FIG. 4, a drive unit A has been illustrated in the form of a schematic side elevation. The drive unit A has a guide sleeve HB for the lap belt B and a guide sleeve HS for the shoulder belt.

In FIG. 4, the stiffening insert V of elastic synthetic material, which extends over the entire length of the shoulder and lap straps S and B, can be seen, and this can be attached to a known kind of webbing belt, for example by injection-molding and have a substantially rectangular or trapezoidal cross-section. The stiffening insert V is provided over its entire length with a drive profile, preferably in the form of perforations P.

The cross-section of the stiffening insert V must be so dimensioned, in accordance with the perforations P, that the insert can hold the extended belt in the form of a free-standing loop.

The stiffening insert V can in this context be provided at specific points with notches or incursions in order to achieve locally differing radii of curvature in the belt loop.

In order to influence the formation of free-standing belt loops in a desired manner, the belt ends pivotally attached to the attachment points O and U respectively at top and bottom of the vehicle side wall, that is to say the ends of the belt sections S and B, can be preloaded in the direction of the inoperative position of the free-standing belt loops, and be pivotable, this through the medium of mechanical or electromechanical spring mechanisms and stops.

By these measures it becomes possible to form the freestanding belt loops so that they are rotated not merely in one plane but in a three-dimensional fashion.

Each guide sleeve HB and HS contains drive gears rb and rs which are driven by an electric motor e through a coupling shaft k and a distributor gear g. The drive gear rb is in this context operated at about twice the speed of the drive gear RS so that the two belt sections S and B can be extended within the same time interval to form free-standing belt loops of approximately the same size.

The two guide sleeves HB and HS are connected to a supporting component T in which a locking device, operated in dependence upon the belt motion or the vehicle deceleration and common to both belt sections S and B, is provided, said device taking the form of a locking roller located in a tapered slot between the two belt sections, the locking roller W being lifted by a mechanism WM in dependence upon the motion or deceleration.

The belt motion produced by the electric motor E in the direction of belt extension is here controlled by limit switch arrangements while the belt motion in the direction of closure of the belt on the wearer is restricted by a disconnect device which limits the belt tension.

The switching on of the electric motor E of the drive unit A can be effected manually or in dependence upon operations such as the starting of the engine and the like.

The pivoting motion of the drive unit A can be produced either manually by the electric motor E or by an electromechanical spring mechanism.

The pivoting device of drive unit A, illustrated in FIG. 5 in the form of an extension to the guide sleeve HS, can, in other designs, equally well be arranged on the supporting component T or on the guide sleeve HB.

I claim:

1. A motor vehicle body in which a seat having a backrest is fitted with a mechanically operable three point safety belt system, the belt system having mutually independent shoulder and lap belt sections, a first and a second attachment means at an upper and a lower location, respectively, on a side wall of the vehicle body, the first attachment means receiving one end of the shoulder belt section and the second attachment means receiving one end of the lap belt section, and a third attachment means located at the center of the vehicle body receiving the other ends of both belt sections, characterized in that a flexible stiffener member carrying drive engageable means is secured to a substantial length of each belt section, the third attachment means comprising a guide means mounted for pivotal movement about a pivot axis lying substantially in the plane of the seat backrest, the stiffened belt sections passing through guide sleeves in the guide device, and a drive mechanism mounted in juxtaposition to the guide device having drive means housed in the guide sleeves in driving engagement with the drive engageable means on the flexible stiffener members, the belt sections having a length such that in extended position they form free standing belt loops which can be pivoted into an inoperative position above the backrest, the drive mechanism being operative to extend and retract the belt sections from operative seat passenger position to inoperative position.

2. A motor vehicle body having a safety belt system as claimed in claim 1, characterized in that the stiffener member consists of an elastic synthetic material band secured to the conventional belt.

3. A motor vehicle body having a safety belt system as claimed in claim 2, characterized in that the drive engageable means is constituted by perforations formed in the stiffener member.

4. A motor vehicle body having a safety belt system as claimed in claim 3,
characterized in that the guide device comprises a supporting component carrying the guide sleeves,
A locking device operable as a function of the belt motion or the vehicle deceleration and common to both belt sections is mounted on the supporting component,
the locking device taking the form of a locking roller movable in a taper slot between the two belt sections.

5. A motor vehicle having a safety belt system as claimed in claim 4,
characterized in that the drive means housed in the guide sleeve associated with the shoulder belt is connected with the drive means of the other guide sleeve, that of the lap belt, via a transmission device which substantially doubles the extension motion of the shoulder belt.

6. A motor vehicle having a safety belt system as claimed in claim 5,
characterized in that the drive means are driven by an electric motor.

7. A motor vehicle body having a safety belt system as claimed in claim 1,
characterized in that the drive engageable means is constituted by perforations formed in the stiffener member.

8. A motor vehicle having a safety belt system as claimed in claim 7,
characterized in that the guide device comprises a supporting component carrying the guide sleeves,
a locking device operable as a function of the belt motion or the vehicle deceleration and common to both belt sections is mounted on the supporting component,
the locking device taking the form of a locking roller movable in a taper slot between the two belt sections.

9. A motor vehicle having a safety belt system as claimed in claim 8,
characterized in that the drive means housed in the guide sleeve associated with the shoulder belt is connected with the drive means of the other guide sleeve, that of the lap belt, via a transmission device which substantially doubles the extension motion of the shoulder belt.

10. A motor vehicle having a safety belt system as claimed in claim 9,
characterized in that the drive means are driven by an electric motor.

11. A motor vehicle body having a safety belt system as claimed in claim 1,
characterized in that the guide device comprises a supporting component carrying the guide sleeves,
a locking device operable as a function of the belt motion or the vehicle deceleration and common to both belt sections is mounted on the supporting component,
the locking device taking the form of a locking roller movable in a taper slot between the two belt sections.

12. A motor vehicle body having a safety belt system as claimed in claim 11,
characterized in that the drive means housed in the guide sleeve associated with the shoulder belt is connected with the drive means of the other guide sleeve, that of the lap belt, via a transmission device which substantially doubles the extension motion of the shoulder belt.

13. A motor vehicle having a safety belt system as claimed in claim 12,
characterized in that the drive means can be driven by an electric motor.

14. A motor vehicle body having a safety belt system as claimed in claim 1,
characterized in that the drive means housed in the guide sleeve associated with the shoulder belt is connected with the drive means of the other guide sleeve, that of the lap belt, via a transmission device which substantially doubles the extension motion of the shoulder belt.

* * * * *